US010793341B2

(12) United States Patent
Lagace

(10) Patent No.: US 10,793,341 B2
(45) Date of Patent: Oct. 6, 2020

(54) GRANULAR DISPENSER

(71) Applicant: Sonoco Development, Inc., Hartsville, SC (US)

(72) Inventor: Chad Lagace, Cohoes, NY (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 16/686,371

(22) Filed: Nov. 18, 2019

(65) Prior Publication Data

US 2020/0165059 A1    May 28, 2020

Related U.S. Application Data

(60) Provisional application No. 62/771,402, filed on Nov. 26, 2018.

(51) Int. Cl.
*B65D 83/06* (2006.01)
*A47G 19/34* (2006.01)

(52) U.S. Cl.
CPC ............ *B65D 83/06* (2013.01); *A47G 19/34* (2013.01)

(58) Field of Classification Search
CPC ........ B65D 83/06; B65D 83/00; A47G 19/34; A47K 5/10; G01F 11/14; G01F 11/18
USPC .................................. 222/361; 239/650, 689
See application file for complete search history.

(56) References Cited

U.S. PATENT DOCUMENTS

| | | | | |
|---|---|---|---|---|
| 922,315 | A * | 5/1909 | McLellan | B65D 83/06 222/336 |
| 1,002,150 | A * | 8/1911 | Henriquez | B05B 11/3011 222/324 |
| 1,090,764 | A * | 3/1914 | Thomas | G01F 11/18 222/308 |
| 2,207,120 | A * | 7/1940 | Greig | B65D 83/06 222/202 |
| 2,603,386 | A * | 7/1952 | Barnes | G01F 11/18 222/184 |
| 2,857,083 | A * | 10/1958 | Masterson | B65D 83/06 222/361 |
| 5,012,957 | A | 5/1991 | Mihail | |
| 5,421,491 | A * | 6/1995 | Tuvim | A47J 31/404 222/336 |
| 5,746,355 | A | 5/1998 | Wold | |
| 5,855,300 | A * | 1/1999 | Malki | A47G 19/34 222/153.09 |
| 6,145,705 | A | 11/2000 | Wallace et al. | |
| 6,450,371 | B1 | 9/2002 | Sherman et al. | |
| 6,962,274 | B1 | 11/2005 | Sherman | |
| 8,827,185 | B2 * | 9/2014 | Simmons | A47J 47/04 239/378 |
| 2003/0164386 | A1 * | 9/2003 | Connelly | G01F 11/16 222/361 |
| 2004/0031819 | A1 * | 2/2004 | Smiley | G01F 11/18 222/449 |
| 2006/0255074 | A1 * | 11/2006 | Amir | G01F 11/18 222/361 |
| 2019/0352060 | A1 * | 11/2019 | Van Der Westhuizen | G01F 11/16 |

* cited by examiner

*Primary Examiner* — Benjamin R Shaw
(74) *Attorney, Agent, or Firm* — Miller, Matthias & Hull LLP

(57) ABSTRACT

A dispenser for dispensing various predetermined volumes of a flowable product such as a granular or powdered product over a desired area by moving a handle-activated slider.

14 Claims, 5 Drawing Sheets

(OPEN)

(OPEN)

(CLOSED)

(OPEN)

(CLOSED)

GRANULAR DISPENSER

BACKGROUND

Field of the Invention

This patent relates to a dispenser for flowable products. More particularly, this patent relates to a dispenser that can dispense various metered amounts of granular product over varying dispersion areas.

Description of the Related Art

Many quick serve restaurants seek to standardize the flavor of their products throughout all of their stores. This standardization requires a dispensing and dispersion device that can dispense a predefined amount of granular seasoning over a predetermined area. However, these amounts and areas can change from one quick serve company to the next.

In addition to standardization of seasoning, another challenge in the quick serve restaurant industry is the clumping of the seasoning. This clumping can cause jamming of current dispensers or can result in the uneven dispensing of product, including having a too-large amount of seasoning in one area.

The present disclosure addresses these challenges.

SUMMARY OF THE INVENTION

The present invention is a dispenser for dispensing a flowable product.

In one aspect a dispenser for dispensing a flowable product is provided. The dispenser comprises a body, a base, a handle, a trigger and slider.

The body has a bottom wall and a sidewall extending upward from a periphery of the bottom wall and terminating at a top rim. The bottom wall and the sidewall define a compartment for holding the flowable product. The top rim defines an opening through which the flowable product may be introduced into the compartment. The bottom wall defines a bottom opening.

The base is attached to the body and comprises a planar platform, an upper portion and a chute. The upper portion extends upward from the platform and is secured to the body. The upper portion separates (spaces) the body bottom wall and the platform 38. The chute extends downwardly from the platform. The platform defines a dispensing opening directly above and in fluid communication with the chute. The handle extends from and is stationary with respect to the body. The trigger is moveably attached to the body or the handle. The trigger includes a retaining structure for operably connecting the trigger to the slider 22.

The slider comprises an elongated slider body, a metering chamber extending downwardly from the slider body and attachment means attached to the slider body that cooperate with the retaining structure to operably connect the slider to the trigger. The metering chamber defines an intake opening at its top end. The metering chamber extends downward from its top end to a bottom end.

The slider is slidably and reciprocally moveable between a closed position and an open position. In the closed position, the bottom opening in the bottom wall is aligned with the intake opening in the slider and the bottom end of the metering chamber is sealed off by the platform. In the open position, the bottom opening in the bottom wall is sealed off by the slider and the bottom end of metering chamber is aligned with the chute so that a discrete amount of flowable product located in the metering chamber can be dispensed through the chute.

The slider may be biased in the closed position. Squeezing the handle and the trigger together causes the slider to move into the open position. The slider may further comprise ribs that extend upwardly from the slider body into the product compartment.

The dispenser may include one or more interchangeable dispersion cones removably attachable to the base. The dispersion cone may be positioned underneath the chute so that the cone is in fluid communication with the chute. The dispersion cone may have an inverted cone shape with an apex located under the chute so that product falling from the chute 46 is dispersed outwardly in a predetermined pattern.

In another aspect, another dispenser for dispensing a flowable product is provided, the dispenser having a closed position and an open position. The dispenser comprises a body, a base, a slider and a trigger.

The body has a bottom wall and a sidewall extending upward from a periphery of the bottom wall. The bottom wall and the sidewall define a compartment for holding the flowable product. The bottom wall defines a bottom opening.

The base is attached to the body in stationary relationship therewith, and comprises a platform, an upper portion and a chute. The platform is spaced vertically from the bottom wall by the upper portion. The chute extends downwardly from the platform. The platform defines a dispensing opening located directly above and in fluid communication with the chute. A dispersion cone may be removably attached to the base.

The slider comprises an elongated slider body and a metering chamber extending downwardly from the slider body. The metering chamber defines an intake opening at its top end and an outflow opening at its bottom end. The slider is reciprocally moveable with respect to the body.

The trigger is moveably attached to the body and is operably connected to the slider. The dispenser normally is in the closed position. When the dispenser is in the closed position, product may flow from the product compartment into the metering chamber but no further. Activating the trigger, such as by squeezing the handle and trigger together, causes the dispenser to open. When the dispenser is in the open position, product located in the metering chamber may flow through the chute.

THE DRAWINGS

DETAILED DESCRIPTION OF THE INVENTION

Figure 1:
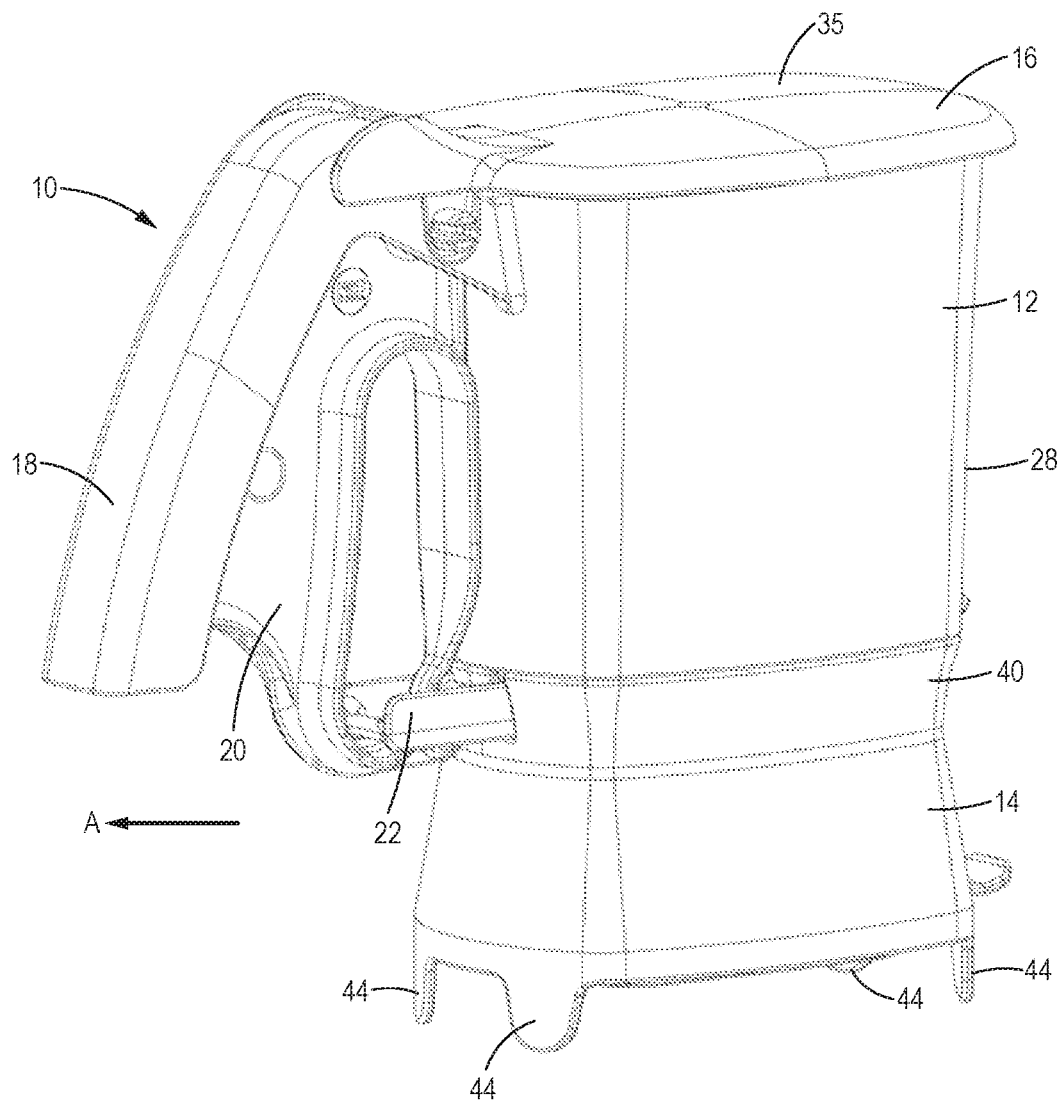
FIG. 1 is a perspective view of a dispenser according to the disclosure.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

Turning to the drawings, there is shown in FIGS. 1 to 5 one embodiment of the present invention, a dispenser 10 having the ability to dispense various predetermined volumes of a flowable product over varying areas by moving a handle activated slider. The flowable product may be a granular or powdered product such as seasoning.

The dispenser 10 comprises a body 12 for holding the granular or powdered product, a base 14 removably attached to or integral with the body 12, a lid 16 for covering a top opening of the body 12, a stationary handle 18 extending from the body 12, a movable and/or deformable triggering element (a.k.a. trigger) 20 moveably attached to the body 12, a slider 22 operably attached to the trigger 20, and one or more interchangeable dispersion cones 24 removably attachable to the base 14.

The body 12 may be constructed of rigid plastic or other suitable material, and has a bottom wall 26 and a sidewall 28 extending upward from a periphery of the bottom wall 26 and terminating at a top rim 30. The bottom wall 26 may be substantially flat or slightly concave so that the flowable product (not shown in the figures) easily moves toward a bottom opening 27 located in the bottom wall 26. The bottom wall 26, the sidewall 28 and the lid 16 define a compartment 32 for holding the flowable product. The top rim 30 defines an opening 34 through which the product may be introduced into the compartment 32 when the lid 16 is raised or otherwise removed from the body 12. As noted above, the bottom wall 26 defines a bottom opening 27, the purpose of which is described below.

Figure 2:
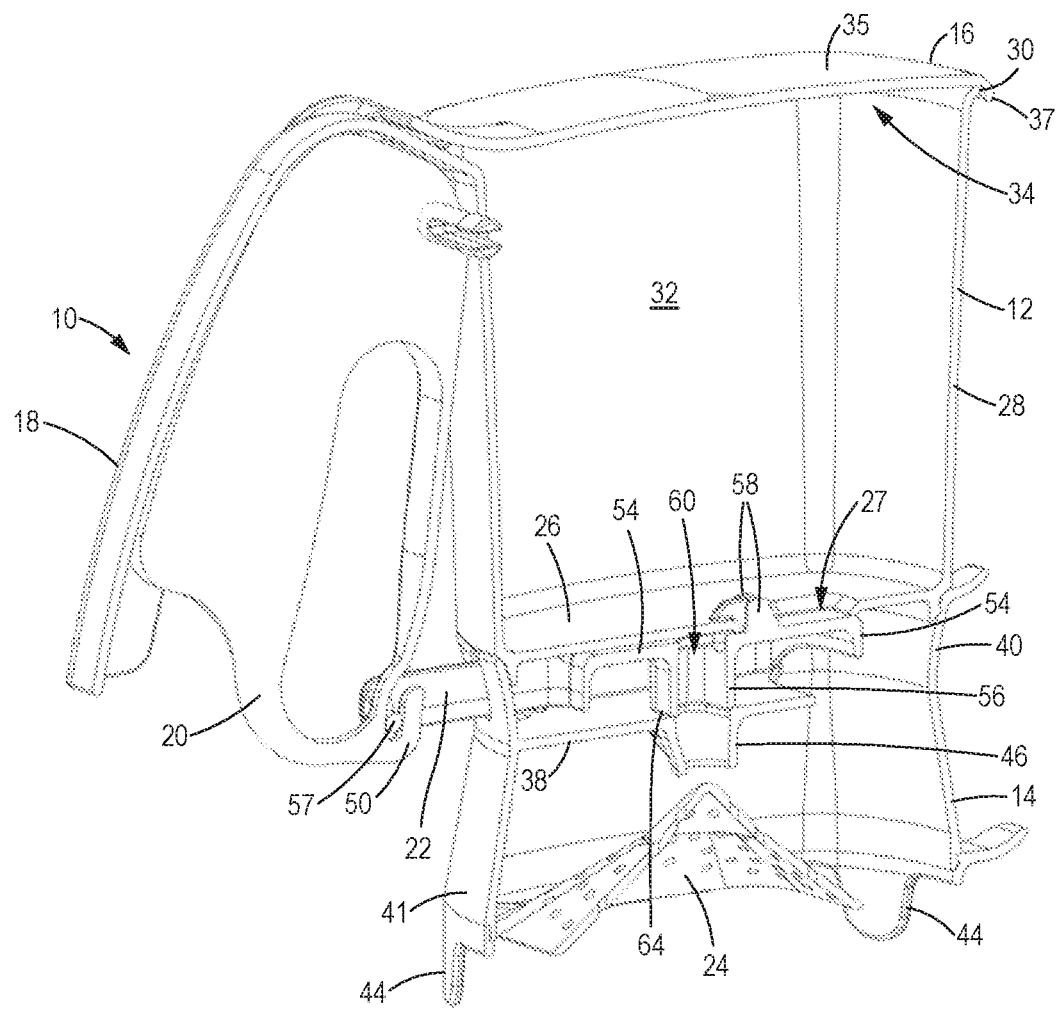
FIG. 2 is a cross-sectional perspective view of the dispenser of FIG. 1 shown in the open (dispensing) position.

As perhaps best shown in FIG. 2, the base 14 is stationary (with respect to the body 12) and comprises a substantially planar platform 38, an upper portion 40, a lower portion 41, and legs 44. The upper portion 40 of the base 14 may be substantially cylindrical, shaped like a truncated cone or any other suitable shape. The upper portion 40 may be removably attached to the body 12 at its upper end and extends downward from the body 12. The lower portion 41 of the base 14 also may be substantially cylindrical, shaped like a truncated cone or any other suitable shape. The lower portion 41 extends downward from the upper portion 40 to the legs 44. The legs 44 support the dispenser 10, and may be of a sufficient length so that the dispersion cone 24 does not contact the surface upon which the dispenser 10 rests. Alternatively or in addition to the legs 44, the dispenser 10 may be supported by the dispersion cone 24.

The platform 38 is substantially flat and extends substantially horizontally between the upper portion 40 and lower portion 41 of the base 14. The platform 38 is spaced vertically from the bottom wall 26. A chute 46 extends downwardly from the platform 38. The platform 38 defines a dispensing opening 48 directly above and in fluid communication with the chute 46. The chute 46 may be cylindrical or other suitable shape and is configured to guide product onto the dispersion cone 24.

The lid 16 may be any suitable configuration that covers the top opening 34 of the body 12. The lid 16 preferably comprises a covering portion 35 that is hingedly attached to the body 12 and a thumb or finger activated lever 36 that, when depressed, raises the covering portion 35 from the top rim 30. The lid may further comprise a downwardly extending skirt 37 that forms a seal with the top rim 30.

The handle 18 may be an elongated structure designed to comfortably fit within a user's palm, and may extend rearward from the body 12. The handle 18 may be stationary with respect to the body 12 and may be an integral part of the body 12. The handle 18 and the lever 36 may be positioned relative to each other so that the same hand can both hold the handle 18 and operate the lever 36.

The triggering element 20 may be rotatably or pivotally attached to the body 12 and/or handle 18 and may include a retaining structure 50 for operably attaching the trigger 20 to the slider 22.

Figure 3:
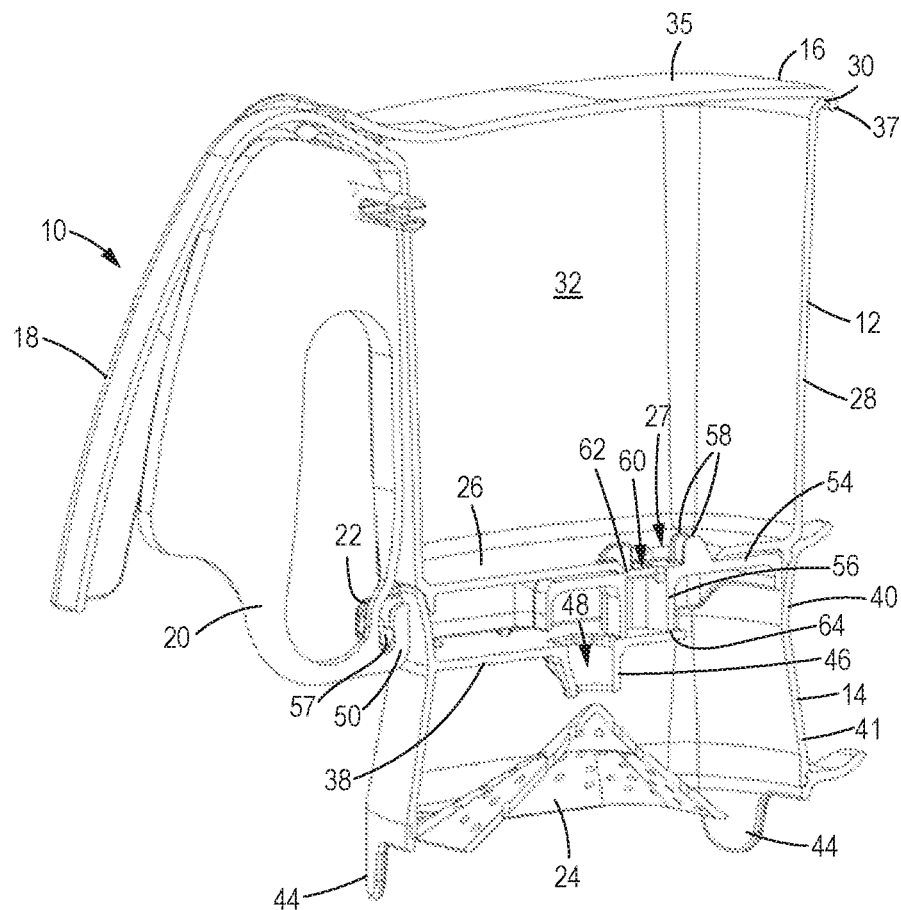
FIG. 3 is a cross-sectional perspective view of the dispenser of FIG. 1 shown in the closed (refilling) position.
Figure 4:
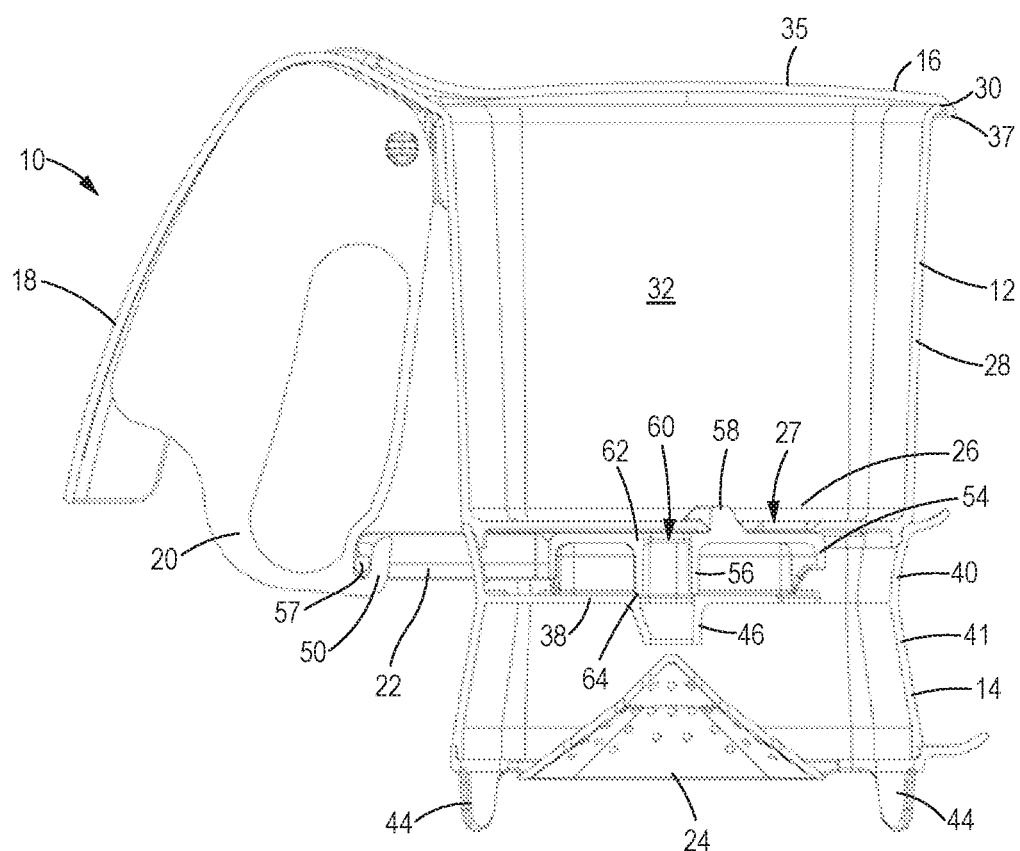
FIG. 4 is a cross-sectional side elevational view of the dispenser of FIG. 2.
Figure 5:
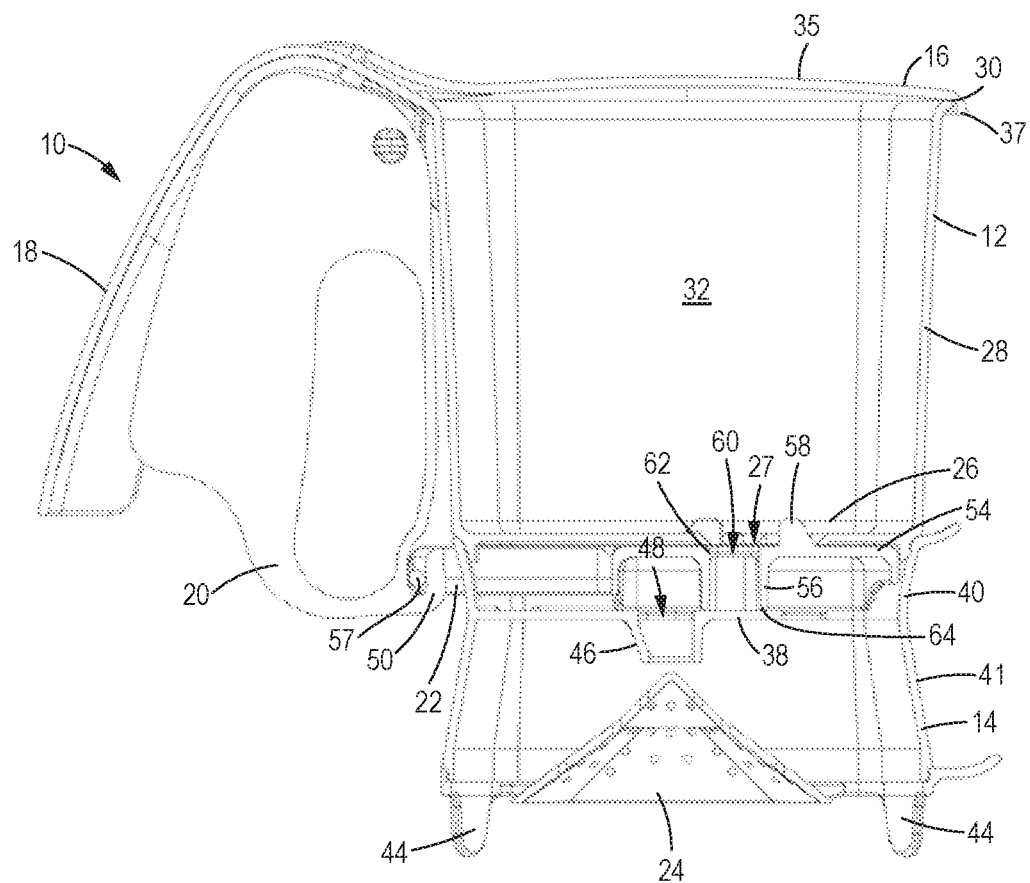
FIG. 5 is a cross-sectional side elevational view of the dispenser of FIG. 3.

The trigger 20 may be made of a made of a resiliently deformable material so that, in its undeformed state, the dispenser 10 is in the closed position shown in FIGS. 3 and 5, and in its deformed state (as when a user squeezes the trigger 20 against the handle 18) the dispenser 10 is in the open position shown in FIGS. 2 and 4.

Alternatively, the trigger 20 may be made of a rigid material and may be moveable between a first (closed) position in which the dispenser 10 is closed and a second (open) position (as when a user squeezes the trigger 20 against the handle 18) in which the dispenser 10 is open and product can be dispensed. A biasing means such as a spring (not shown) may be used to bias the trigger 20 in the closed position.

The slider 22 may comprise an elongated slider body 54, a metering chamber 56 extending downwardly from the slider body 54, and attachment means 57 attached to the slider body 54 and that cooperate with the retaining structure 50 to operably connect the slider 22 to the trigger 20. The attachment means 57 may be any suitable structure, including bosses or detents that extend through slots or openings in the retaining structure 50.

The slider body 54 extends from the trigger 20 through an opening in the base to a position underneath the body bottom wall 26 and above the platform 38. The slider body 54 may be positioned so that its topmost surface is in sliding abutment with the bottom wall 26 and so that the bottom end 64 of the metering chamber 56 is in sliding abutment with the bottom wall 26.

The metering chamber 56 extends downwardly from the slider body 54 and may be cylindrical or any suitable shape. The metering chamber 56 defines an intake opening 60 at its top end 62 that communicates with the product compartment 32 when the dispenser 10 is in the closed position and an outflow opening at its bottom end 64 through which product may flow into the chute 46 when the dispenser 10 is in the open position. As noted above, the bottom end 64 may be positioned so that it is in sliding abutment with the platform 38. Thus, the slider 22 moves reciprocally with respect to the bottom wall 26 and the platform 38 between a closed position (in which the bottom end 64 of the metering chamber 56 abuts the platform 38) and an open position (in which the bottom end 64 of the metering chamber 56 is oriented above the chute 46 as described further below).

The metering chamber 56 may be sized and calibrated so that the dispenser 10 dispenses a predetermined amount of product with each use. The dispenser 10 may be provided with multiple interchangeable metering chambers 56 of different volumes for dispensing different amounts of product. For example, in one aspect the slider 22 may be configured to receive multiple interchangeable metering chambers 56 of different volumes. In another aspect, the dispenser 10 may be provided with multiple interchangeable sliders 22, each having a metering chamber 56 of a different volume.

The slider 22 may further comprise ribs 58 that extend upwardly from the slider body 54 near the top end 62 of the metering chamber 56 and into the product compartment 32 to help break up any clumps of product that may exist before they enter the metering chamber 56. The ribs 58 may be shaped like fins or have any suitable shape. Where ribs 58 are present, the bottom opening 27 in the bottom wall 26 should be large (wide) enough to accommodate the reciprocal travel of the ribs 58 within the product compartment 32. Preferably, and to best effect, the ribs 58 are positioned on the slider 22 so that each time the dispenser 10 is opened the ribs 58 travel over an area just above where the metering chamber 56 is located when the dispenser 10 is in the closed position, thereby minimizing any clumps that may enter the metering chamber 56.

The dispersion cone 24 is positioned underneath the chute 46 so that it is in fluid communication with the chute 46. The dispersion cone 24 may be removably attached to the chute 46 and/or the base 14. The dispersion cone 24 may have an inverted cone the shape with an apex located under the bottom of the chute 46 so that product falling from the chute 46 is dispersed outwardly in a predetermined pattern. The dispenser 10 may allow for multiple dispersion cones 24 to be attached to the chute 46 and/or base 14 to allow for customized dispersion patterns. For example, the bottom of the dispersion cone may be square, rectangular, circular or any other suitable shape.

Principle of Operation

The dispenser 10 is moveable (reconfigurable) between the closed position shown in FIGS. 3 and 5 and the open position shown in FIGS. 2 and 4.

In the closed position, the bottom opening 27 in the bottom wall 26 is aligned with the intake opening 60 in the slider 22, allowing product to flow through the bottom opening 27 and the intake opening 60 and into the metering chamber 56 but no further. The flowable product cannot exit the metering chamber 56 because the bottom end 64 of the metering chamber 56 abuts (is closed off by) the platform 38, as shown in FIGS. 3 and 5.

In the open position, the slider 22 is positioned (slid) rearward of its closed position as shown in FIGS. 2 and 4. This rearward movement of the slider 22 may be caused by squeezing the handle 18 and the trigger 20 together to either compress the triggering element 20 or to rotate it so that the retaining structure 50 (and thus the slider 22) moves rearward. When this rearward movement of the slider 22 occurs, the bottom opening 27 in the bottom wall 26 is no longer aligned with the intake opening 60 in the slider 22, but rather is closed off by the topmost surface of the slider body 54. Consequently, the product compartment 32 is closed off from the metering chamber 56.

While in the open position, the metering chamber 56 is aligned with the chute 46, and a discrete amount of flowable product located in the metering chamber 56 can be dispensed (dropped through) through the chute 46 and onto the dispersion cone 24.

Method of Operation

The dispenser 10 is "handle activated". As the operator squeezes the handle 18 and trigger 20 together, the trigger 20 moves rearward in the direction of arrow A in FIG. 1. The rearward movement of the trigger 20 and, in particular, the retaining structure 50, causes the slider 22 to move rearward in the direction of arrow A and toward the back of the dispenser 10 (shown on the left in the figures). During this travel, the slider 22 and more specifically, the slider body 54 closes off the bottom opening 27 in the bottom wall 26, preventing any product from exiting the compartment 32. Also, during this movement of the slider 22, the crushing ribs 58 can break apart any clumps of product located in the lower part of the compartment 32.

In the final (fully opened) position shown in FIGS. 2 and 4, the intake opening 60 in the slider 22 is aligned with the chute 46 and the dispersion cone 24 (if present). The flowable product exits the metering chamber 56 of the slider 22 and pours over the dispersion cone 24. The dispersion cone 24 spreads the seasoning out over a predefined area. Once the seasoning is dispersed, the operator releases the trigger 20 or otherwise allows it to resume its closed (biased) position, and the slider 22 moves back to its closed or resting (refilling) position as shown in FIGS. 3 and 5. In the resting position, seasoning is allowed to flow into the metering chamber 56 and fill a predefined volume in the metering chamber 56, ready for future dispensing. This dispense-and-refill process can be repeated until the compartment 32 is empty of seasoning.

It is understood that the embodiments described above are only particular examples which serve to illustrate the principles of the disclosed apparatus. Modifications and alternative embodiments of the apparatus are contemplated which do not depart from the scope of the invention as defined by the foregoing teachings and appended claims. It is intended that the claims cover all such modifications and alternative embodiments that fall within their scope.

I claim as my invention:

1. A dispenser for dispensing a flowable product, the dispenser comprising:
    a body for holding a flowable product, the body having a bottom wall and a sidewall extending upward from a periphery of the bottom wall and terminating at a top rim, the bottom wall and the sidewall defining a compartment for holding the flowable product, the top rim defining an opening through which the flowable product may be introduced into the compartment, the bottom wall defining a bottom opening;
    a base attached to the body and comprising a planar platform, an upper portion and a chute, the upper portion extending upward from the platform and secured to the body, the upper portion separating the body bottom wall and the platform, the chute extending downwardly from the platform, the platform defining a dispensing opening directly above and in fluid communication with the chute, the base further comprising a lower portion extending downward from the upper portion and legs for supporting the dispenser on a surface;
    a handle extending from and stationary with respect to the body;
    a trigger moveably attached to the body or the handle, the trigger including a retaining end for operably connecting the trigger to a slider; and
    a slider comprising an elongated slider body, a metering chamber extending downwardly from the slider body and attachment means attached to the slider body that cooperate with the retaining end to operably connect the slider to the trigger, the metering chamber defining an intake opening at its top end, the metering chamber extending downward from its top end to a bottom end, the slider being slidably and reciprocally moveable between a closed position and an open position; wherein
    in the closed position, the bottom opening in the bottom wall is aligned with the intake opening in the slider and the bottom end of the metering chamber is sealed off by the platform; and
    in the open position, the bottom opening in the bottom wall is sealed off by the slider and the bottom end of metering chamber is aligned with the chute so that a discrete amount of flowable product located in the metering chamber can be dispensed through the chute.

2. The dispenser of claim 1 wherein:
the slider is biased in the closed position; and
squeezing the handle and the trigger together causes the slider to move into the open position.

3. The dispenser of claim 1 further comprising:
one or more interchangeable dispersion cones removably attachable to the base.

4. The dispenser of claim 1 further comprising:
a dispersion cone removably attachable to the base.

5. The dispenser of claim 4 wherein:
the dispersion cone is positioned underneath the chute so that it is in fluid communication with the chute.

6. The dispenser of claim 5 wherein:
the dispersion cone is removably attached to the base.

7. The dispenser of claim 5 wherein:
the dispersion cone has an inverted cone shape with an apex located under the chute so that product falling from the chute is dispersed outwardly in a predetermined pattern.

8. The dispenser of claim 5 wherein:
the dispersion cone is configured to disperse product in a predetermined dispersion pattern.

9. The dispenser of claim 1 wherein:
the slider further comprises ribs that extend upwardly from the slider body into the product compartment.

10. The dispenser of claim 9 wherein:
the bottom opening in the bottom wall is large enough to accommodate reciprocal travel of the ribs within the product compartment.

11. The dispenser of claim 9 wherein:
the ribs are positioned on the slider so that each time the dispenser is opened the ribs travel over an area just above where the metering chamber is located when the dispenser is in the closed position.

12. The dispenser of claim 9 wherein:
the ribs are shaped like fins.

13. The dispenser of claim 1 further comprising:
a lid for covering a top opening of the body.

14. The dispenser of claim 1 further comprising:
a dispersion cone removably attachable to the base; wherein
the legs are of a sufficient length so that the dispersion cone does not contact the surface.

* * * * *